(12) United States Patent
Chang

(10) Patent No.: US 12,244,330 B2
(45) Date of Patent: Mar. 4, 2025

(54) TRANSMISSION DEVICE

(71) Applicant: NANYA TECHNOLOGY CORPORATION, New Taipei (TW)

(72) Inventor: Chih-Hang Chang, Hsinchu (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 301 days.

(21) Appl. No.: 18/088,736

(22) Filed: Dec. 26, 2022

(65) Prior Publication Data
US 2024/0214013 A1    Jun. 27, 2024

(51) Int. Cl.
*H04B 1/04*    (2006.01)

(52) U.S. Cl.
CPC ... *H04B 1/0458* (2013.01); *H04B 2001/0408* (2013.01)

(58) Field of Classification Search
CPC ............... H04B 1/0458; H04B 2001/0408
USPC .................................................... 455/552.1
See application file for complete search history.

(56) References Cited

U.S. PATENT DOCUMENTS

| | | | | |
|---|---|---|---|---|
| 9,389,624 B2 * | 7/2016 | Handford | ................ | G05F 1/468 |
| 11,120,772 B1 * | 9/2021 | Hsieh | .................. | H03F 3/45273 |
| 11,209,846 B2 * | 12/2021 | Satou | ...................... | G05F 1/468 |
| 2008/0180161 A1 | 7/2008 | Jo et al. | | |
| 2009/0302824 A1 | 12/2009 | Kim et al. | | |
| 2013/0214869 A1 * | 8/2013 | Matsuzaki | ............ | H02M 3/156 331/70 |
| 2019/0199287 A1 * | 6/2019 | Kuwano | ............... | H03K 3/0231 |
| 2022/0382308 A1 * | 12/2022 | Chang | ................. | H03F 3/45475 |
| 2024/0103556 A1 * | 3/2024 | Lim | ........................ | G05F 1/567 |
| 2024/0162858 A1 * | 5/2024 | Wu | ......................... | H03B 5/24 |
| 2024/0171158 A1 * | 5/2024 | Wu | ....................... | H03K 3/0231 |

OTHER PUBLICATIONS

"Office Action of Taiwan Counterpart Application", issued on Sep. 21, 2023, p. 1-p. 8.

\* cited by examiner

*Primary Examiner* — Hirdepal Singh
(74) *Attorney, Agent, or Firm* — JCIPRNET

(57) ABSTRACT

A transmission device is provided. The transmission device includes a voltage generator, a convertor, a voltage buffer and a transmission element. The voltage generator generates a first voltage signal according to a first current. The convertor generates a second current using a source current proportional to a temperature, generates a third current according to the first voltage signal, and converts a sum of the second current and the third current to a second voltage signal. The voltage buffer generates a driving voltage proportional to the temperature according to the second voltage signal. The transmission element operates based on the driving voltage.

10 Claims, 4 Drawing Sheets

TRANSMISSION DEVICE

BACKGROUND

Technical Field

The disclosure generally relates to a transmission device, and more particularly to a transmission device having different circuit characteristics at higher temperature.

Description of Related Art

Generally, a transmission device is used to receive data and transmit the data. A power consumption of the transmission device is associated with a driving power. When the driving power of the transmission device has high driving power, the transmission device has high power consumption. When the driving power of the transmission device has low driving power, the transmission device has low power consumption.

At lower temperature, the transmission device has higher transmission quality. It should be noted, the driving power is constant. The power consumption is constant. The power consumption cannot be decreased at lower temperature. At higher temperature, a transmission quality of the transmission device would be decreased. This lower transmission quality may cause the transmission device has high bit error rate. Therefore, a data loss would be increased.

SUMMARY

The disclosure provides a transmission device having high transmission ability at higher temperature and having low power consumption at lower temperature.

The transmission device of the disclosure includes a voltage generator, a convertor, a voltage buffer and a transmission element. The voltage generator generates a first voltage signal according to a first current. The convertor is coupled to the voltage generator. The convertor generates a second current using a source current proportional to a temperature, generates a third current according to the first voltage signal, and converts a sum of the second current and the third current to a second voltage signal. The voltage buffer is coupled to the convertor. The voltage buffer generates a driving voltage according to the second voltage signal. The transmission element is coupled to the voltage buffer. The transmission element operates based on the driving voltage. The driving voltage is proportional to the temperature.

Based on the above, the convertor generates the second current using the source current proportional to the temperature and generates the third current. The convertor converts a sum of the second current and the third current to a second voltage signal. Therefore, the second voltage signal is proportional to the temperature. The voltage buffer generates the driving voltage according to the second voltage signal. The driving voltage is proportional to the temperature. Thus, the transmission device has high transmission ability at higher temperature and has low power consumption at lower temperature.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being "coupled to", "connected to", or "conducted to" another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

Figure 1:
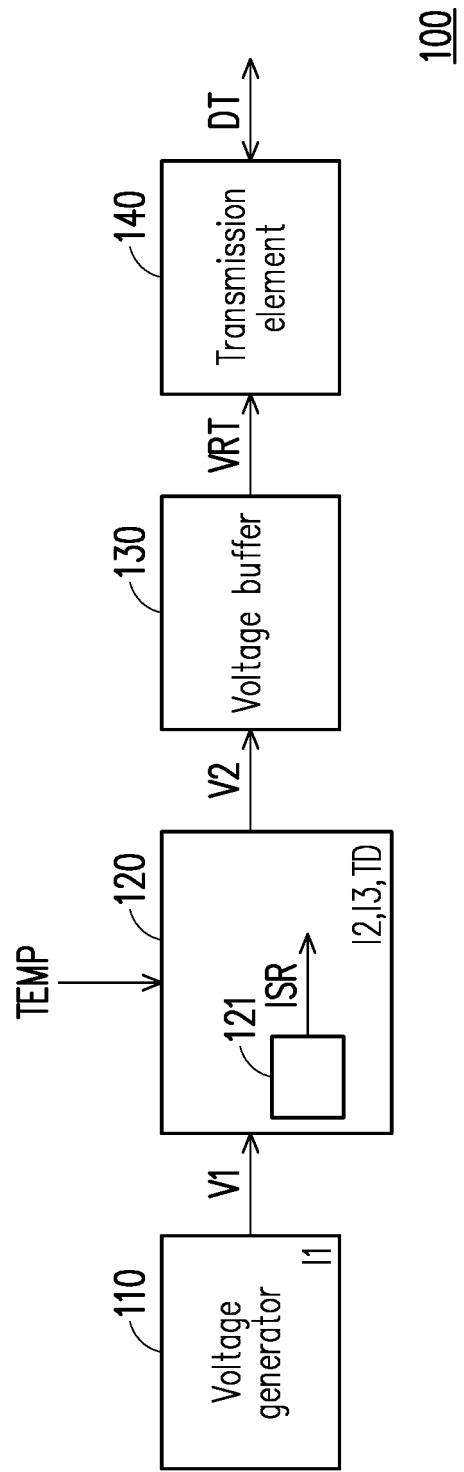
FIG. 1 illustrates a schematic diagram of a transmission device according to a first embodiment of the disclosure.

Referring to FIG. 1. FIG. 1 illustrates a schematic diagram of a transmission device according to a first embodiment of the disclosure. In the embodiment, the transmission device 100 includes a voltage generator 110, a convertor 120, a voltage buffer 130 and a transmission element 140. The voltage generator 110 generates a first voltage signal V1 according to a first current I1. The convertor 120 is coupled to the voltage generator 110. The voltage generator 110 may be implemented by a voltage regulator or a low-dropout (LDO) circuit.

In the embodiment, the convertor 120 generates a second current I2 using a source current ISR proportional to a temperature TEMP. For example, the source current ISR is a current proportional to absolute temperature (PTAT), but the disclosure is not limited thereto. The convertor 120 receives the first voltage signal V1 from the voltage generator 110. The convertor generates a third current I3 according to the first voltage signal V1. The convertor 120 converts a sum of the second current I2 and the third current I3 to a second voltage signal V2. In the embodiment, the convertor 120 may be a current-to-voltage convertor.

In the embodiment, the voltage buffer 130 is coupled to the convertor 120. The voltage buffer 130 generates a driving voltage VRT according to the second voltage signal V2 from the convertor 120. The driving voltage is proportional to the temperature TEMP. The voltage buffer 130 may sable the second voltage signal V2 to be the driving voltage VRT and/or increase a fan-out current. Therefore, the voltage buffer 130 increases the fan-out ability of the driving voltage VRT. The transmission element 140 is coupled to the voltage buffer 130. The transmission element 140 operates based on the driving voltage. In the embodiment, the transmission element 140 may be an interface circuit for receiving data DT and transmitting the data DT.

It should be noted, the convertor 120 generates the second current I2 using the source current ISR proportional to the temperature TEMP and generates the third current. The second current I2 is proportional to the temperature TEMP. The convertor 120 converts the sum of the second current I2 and the third current I3 to a second voltage signal V2. Therefore, the second voltage signal V2 is also proportional to the temperature TEMP. The voltage buffer 130 generates the driving voltage VRT according to the second voltage signal V2. The driving voltage VRT is proportional to the temperature TEMP. Thus, the transmission device 100 has high transmission ability at based on the driving voltage VRT at higher temperature. Besides, the transmission device 100 has low power consumption based on the driving voltage VRT at lower temperature. Therefore, the transmission device 100 has low power consumption and high transmission ability at lower temperature. In other words, the transmission device 100 can automatically adjust the driving voltage VRT in response to the temperature TEMP.

In the embodiment, the convertor 120 includes a current source 121. The current source 121 provides the source current ISR in response to the temperature TEMP.

In the embodiment, the third current I3 is proportional to the first current I1 and lower than the first current I1. For example, a current value of the third current I3 is 0.5 to 0.8 times of a current value of the first current I1, but the disclosure is not limited thereto.

In the embodiment, when the temperature TEMP is a default temperature TD, the sum of the second current I2 and the third current I3 is designed to equal to the first current I1. The second current I2 is proportional to a temperature TEMP. Therefore, when the temperature TEMP is high than the default temperature TD, the sum of the second current I2 and the third current I3 is high than the first current I1. Besides, when the temperature TEMP is low than the default temperature TD, the sum of the second current I2 and the third current I3 is low than the first current I1.

Based on actual requirements, the default temperature TD may be decided. For example, the default temperature TD may be decided as room temperature, but the disclosure is not limited thereto. When the temperature TEMP is the room temperature, the sum of the second current I2 and the third current I3 is designed to equal to the first current I1. When the temperature TEMP is high than the room temperature, the sum of the second current I2 and the third current I3 is high than the first current I1. Therefore, the driving voltage VRT at higher temperature is higher than the driving voltage VRT at room temperature. Besides, when the temperature TEMP is low than the room temperature, the sum of the second current I2 and the third current I3 is low than the first current I1. Therefore, the driving voltage VRT at lower temperature is lower than the driving voltage VRT at room temperature.

Figure 2:
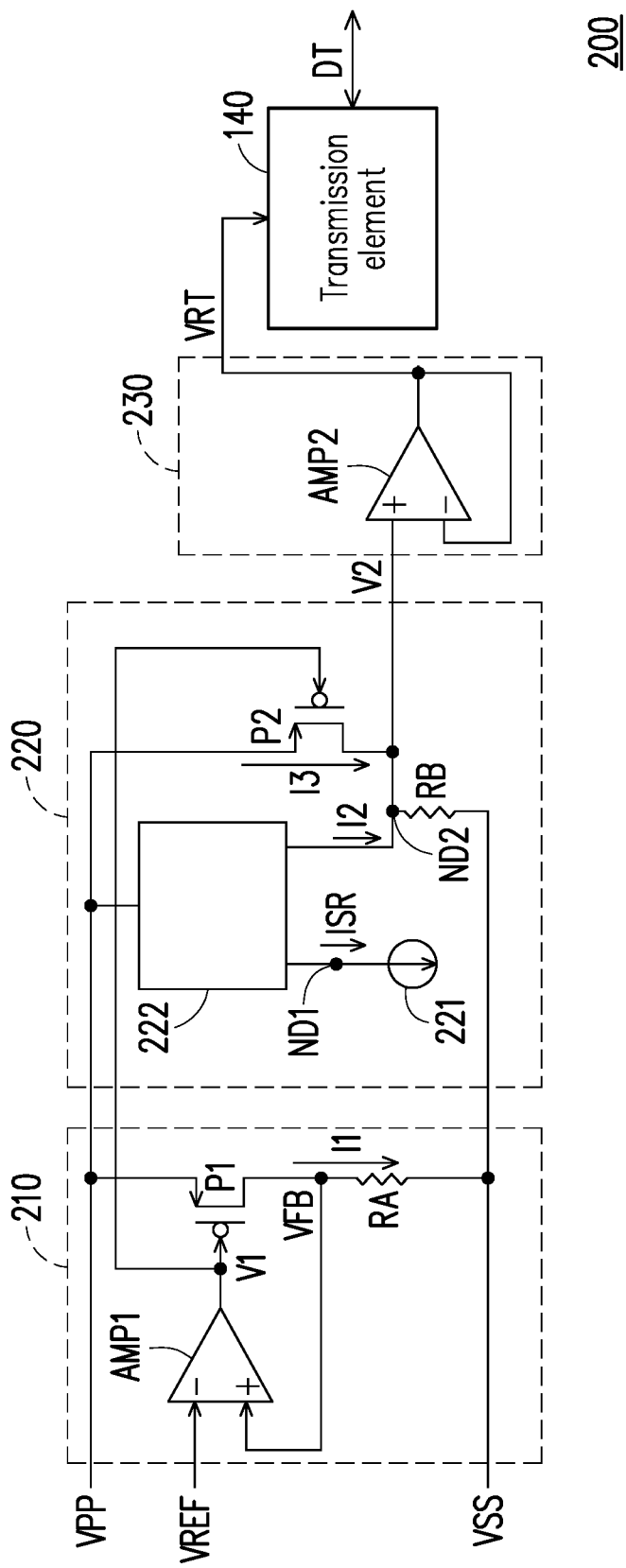
FIG. 2 illustrates a schematic diagram of a transmission device according to a second embodiment of the disclosure.

Referring to FIG. 2. FIG. 2 illustrates a schematic diagram of a transmission device according to a second embodiment of the disclosure. In the embodiment, the transmission device 200 includes a voltage generator 210, a convertor 220, a voltage buffer 230 and the transmission element 140. The voltage generator 210 includes an operational amplifier AMP1, a resistor RA and a transistor P1. In the embodiment, a first input terminal of the operational amplifier AMP1 receives a reference voltage VREF. An output terminal of the operational amplifier AMP1 outputs the first voltage signal V1. The resistor RA is coupled between a second input terminal of the operational amplifier AMP1 and a reference low voltage VSS. A first terminal of the transistor P1 is coupled to a reference high voltage VPP. A second terminal of the transistor P1 is coupled to the second input terminal of the operational amplifier AMP1. A control terminal of the transistor P1 is coupled to the output terminal of the operational amplifier AMP1. In the embodiment, the transistor P1 is a p-type transistor (for example, p-type MOSFET), but the disclosure is not limited thereto. Therefore, the first input terminal of the operational amplifier AMP1 is an inverting input terminal, the second input terminal of the operational amplifier AMP1 is a non-inverting input terminal.

In the embodiment, the voltage generator 210 generates a feedback voltage VFB according to a resistance value of the resistor RA and the current value of the first current I1 flowing through the resistor RA, and generates the first voltage signal V1 according to the reference voltage VREF and the feedback voltage VFB.

In the embodiment, the convertor 220 includes a current source 221, a resistor RB, a current mirror 222 and a transistor P2. The current source 221 is coupled to a first node ND1. The current source 221 provides the source current ISR proportional to the temperature. The resistor RB is coupled between a second node ND2 and the reference low voltage VSS. The current mirror 222 is coupled to the first node ND1 and the second node ND2. The current mirror 222 mirrors the source current ISR to generate the second current I2 flowing through the second node ND2. A first terminal of the transistor P2 is coupled to the reference high voltage VPP. A second terminal of the transistor P2 is coupled to the second node ND2. A control terminal of the transistor P2 is coupled to the output terminal of the operational amplifier AMP1. The control terminal of the transistor P2 receives the first voltage signal V1. The transistor P1 and the transistor P2 are controlled by the first voltage signal V1. Therefore, the third current I3 is proportional to the first current I1.

In the embodiment, the convertor 220 generates the second voltage signal V2 according to a resistance value of the resistor RB and a current value of the sum of the second current I2 and the third current I3.

In the embodiment, the voltage buffer 230 includes an operational amplifier AMP2. A non-inverting input terminal of the operational amplifier AMP2 receives the second voltage signal V2 from the convertor 220. An inverting input terminal of the operational amplifier AMP2 is coupled to an output terminal of the operational amplifier AMP2. The output terminal of the operational amplifier AMP2 is used to output the driving voltage VRT. The transmission element 140 receives the driving voltage VRT and operates based on the driving voltage VRT.

For example, the default temperature (that is, the default temperature TD of FIG. 1) may be decided as room temperature, but the disclosure is not limited thereto. When the temperature TEMP is closed to the room temperature, the sum of the second current I2 and the third current I3 is approximate to equal to the first current I1. Therefore, the driving voltage VRT is approximate to the reference voltage VREF. When the temperature TEMP is high than the room temperature, the sum of the second current I2 and the third current I3 is high than the first current I1. Therefore, the driving voltage VRT at higher temperature is higher than the reference voltage VREF. Thus, the transmission device 200 has high transmission ability at higher temperature. Besides, when the temperature TEMP is low than the room temperature, the sum of the second current I2 and the third current I3 is low than the first current I1. Therefore, the driving voltage VRT at lower temperature is lower than the reference voltage VREF. Thus, the transmission device 200 has low power consumption and high transmission ability at lower temperature.

Figure 3:
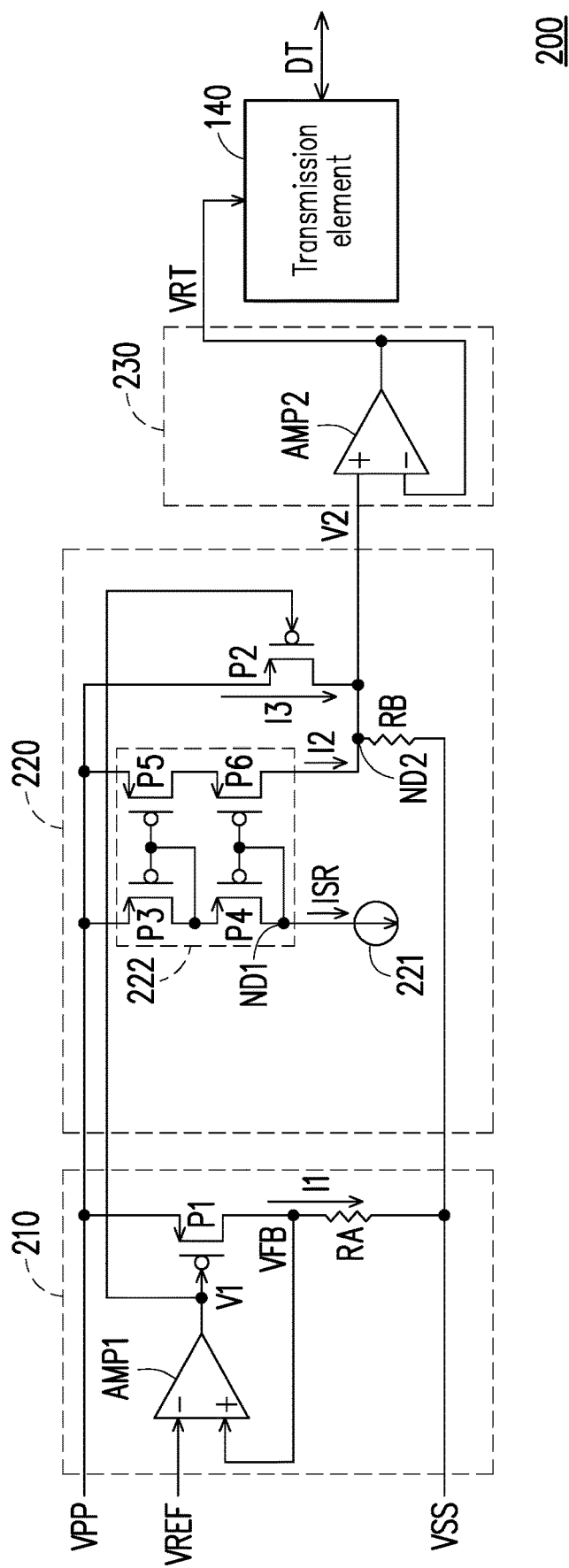
FIG. 3 illustrates a circuit diagram of a transmission device according to the second embodiment of the disclosure.

Detailly, please referring to FIG. 3, FIG. 3 illustrates a circuit diagram of a transmission device according to the second embodiment of the disclosure. In the embodiment, the convertor 220 includes the current source 221, the resistor RB, the current mirror 222 and the transistor P2. The current mirror 222 includes transistors P3, P4, P5 and P6. A first terminal of the transistor P3 is coupled to the reference high voltage VPP. A first terminal of the transistor P4 is coupled to a second terminal of the transistor P3 and a control terminal of the transistor P3. A second terminal of the transistor P4 and a control terminal of the transistor P4 are coupled to the first node ND1. A first terminal of the transistor P5 is coupled to the reference high voltage VPP. A control terminal of the transistor P5 is coupled to the control terminal of the transistor P3. A first terminal of the transistor P6 is coupled to a second terminal of the transistor P5. A second terminal of the transistor P6 is coupled to the second node ND2. A control terminal of the transistor P6 is coupled to the control terminal of the transistor P4.

In the embodiment, the transistors P3 and P5 form a current mirror circuit. The transistors P4 and P6 form another current mirror circuit. The current mirror 222 is a cascode current mirror circuit. Therefore, the current mirror 222 can precisely mirror the source current ISR to generate the second current I2 flowing through the second node ND2.

In the embodiment, the transistors P2 to P6 are a p-type transistor (for example, p-type MOSFET), but the disclosure is not limited thereto.

Figure 4:
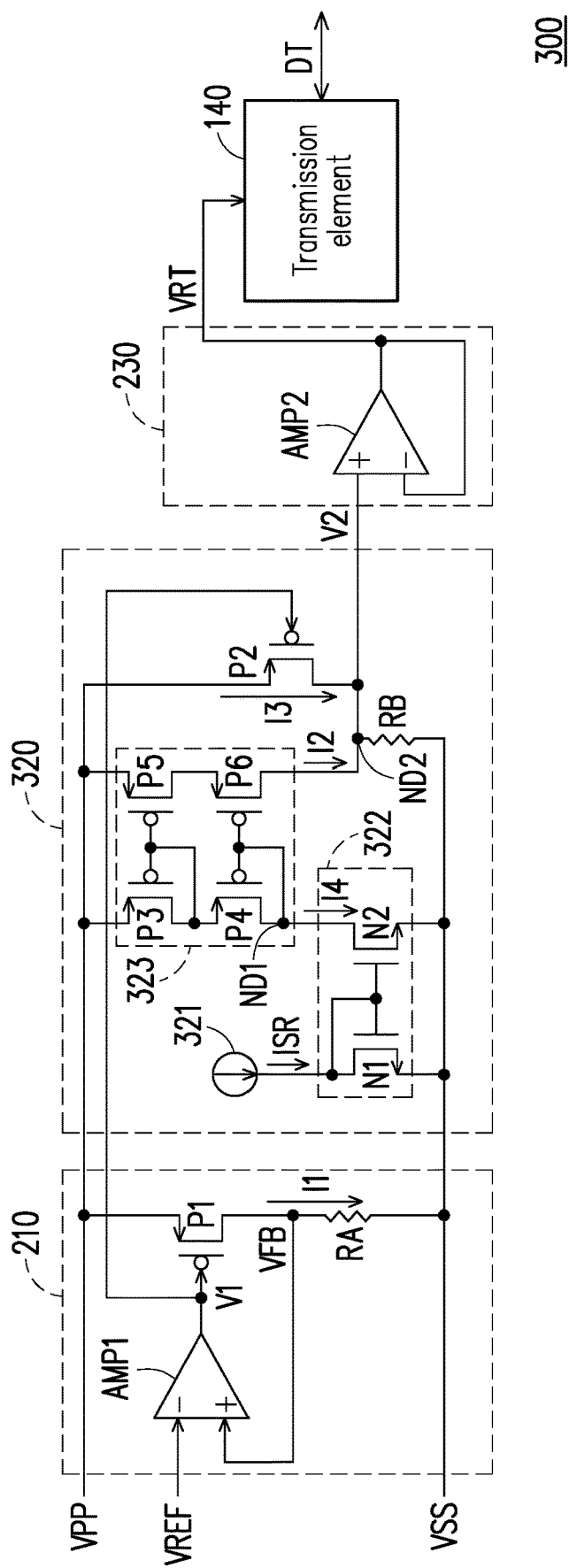
FIG. 4 illustrates a circuit diagram of a transmission device according to a third embodiment of the disclosure.

Referring to FIG. 4. FIG. 4 illustrates a circuit diagram of a transmission device according to a third embodiment of the disclosure. In the embodiment, the transmission device 300 includes the voltage generator 210, a convertor 320, the voltage buffer 230 and the transmission element 140. The implementation details of the voltage generator 210, the voltage buffer 230 and the transmission element 140 have been clearly explained in the embodiment of FIGS. 2 and 3, so they will not be repeated here. In the embodiment, the convertor 320 includes a current source 321, current mirrors 322 and 323, the resistor RB and the transistor P2. The current source 321 provides the source current ISR proportional to the temperature. The current mirror 322 is coupled to the first node ND1 and the current source 321. The current mirror 322 mirrors the source current to generate a fourth current I4 flowing through the first node ND1. The second resistor is coupled between the second node ND2 and the reference low voltage VSS. The current mirror 323 is coupled to the first node ND1 and the second node ND2. The current mirror 323 precisely mirrors the fourth current I4 to generate the second current I2 flowing through the second node ND2. A first terminal of the transistor P2 is coupled to the reference high voltage VPP. A second terminal of the transistor P2 is coupled to the second node ND2. A control terminal of the transistor P2 is coupled to the output terminal of the operational amplifier AMP1. The control terminal of the transistor P2 receives the first voltage signal V1. The transistor P1 and the transistor P2 are controlled by the first voltage signal V1. Therefore, the third current I3 is proportional to the first current I1.

The current mirror 322 includes transistors N1 and N2. A first terminal of the transistor N1 and a control terminal of the transistor N1 are coupled to the current source 321. A second terminal of the transistor N2 is coupled to the reference low voltage VSS. A first terminal of the transistor N2 is coupled to the first node ND1. A second terminal of the transistor N2 is coupled to the reference low voltage VSS. A control terminal of the transistor N2 is coupled to the control terminal of the transistor N1.

The current mirror 322 includes the transistors P3, P4, P5 and P6. A circuit configuration of the transistors P3. P4. P5 and P6 is similar to the circuit configuration of the transistors P3, P4, P5 and P6 in FIG. 3, so they will not be repeated here.

In the embodiment, the transistors P2 to P6 are a p-type transistor (for example, p-type MOSFET), but the disclosure is not limited thereto. The transistors N1 and N2 are a n-type transistor (for example, n-type MOSFET), but the disclosure is not limited thereto.

In view of the foregoing, the convertor generates the second current using the source current proportional to the temperature and generates the third current. The second current is proportional to the temperature. The convertor converts the sum of the second current and the third current to a second voltage signal. Therefore, the second voltage signal is also proportional to the temperature. The voltage buffer generates the driving voltage according to the second voltage signal. The driving voltage is proportional to the temperature. Thus, the transmission device has high transmission ability at based on the driving voltage at higher temperature and has low power consumption based on the driving voltage at higher temperature.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A transmission device, comprising:
   a voltage generator, configured to generate a first voltage signal according to a first current;
   a convertor, coupled to the voltage generator, configured to generate a second current using a source current proportional to a temperature, generate a third current according to the first voltage signal, and convert a sum of the second current and the third current to a second voltage signal;

a voltage buffer, coupled to the convertor, configured to generate a driving voltage according to the second voltage signal; and a transmission element, coupled to the voltage buffer, configured to operate based on the driving voltage, wherein the driving voltage is proportional to the temperature.

2. The transmission device of claim 1, wherein the third current is proportional to the first current and lower than the first current.

3. The transmission device of claim 1, wherein when the temperature is a default temperature, the sum of the second current and the third current is equal to the first current.

4. The transmission device of claim 3, wherein:

when the temperature is high than the default temperature, the sum of the second current and the third current is high than the first current, and when the temperature is low than the default temperature, the sum of the second current and the third current is low than the first current.

5. The transmission device of claim 1, wherein the voltage generator comprises:

an operational amplifier, wherein a first input terminal of the operational amplifier receives a reference voltage, wherein an output terminal of the operational amplifier outputs the first voltage signal;

a first resistor, coupled between a second input terminal of the operational amplifier and a reference low voltage; and a first transistor, wherein a first terminal of the first transistor is coupled to a reference high voltage, wherein a second terminal of the first transistor is coupled to the second input terminal of the operational amplifier, wherein a control terminal of the first transistor is coupled to the output terminal of the operational amplifier.

6. The transmission device of claim 5, wherein the voltage generator generates a feedback voltage according to a resistance value of the first resistor and a current value of the first current flowing through the first resistor, and generates the first voltage signal according to the reference voltage and the feedback voltage.

7. The transmission device of claim 5, wherein the convertor comprises:

a current source, coupled to a first node, configured to provide the source current;

a second resistor, coupled between a second node and the reference low voltage;

a current mirror, coupled to the first node and the second node, configured to mirror the source current to generate the second current flowing through the second node; and a second transistor, wherein a first terminal of the second transistor is coupled to the reference high voltage, wherein a second terminal of the second transistor is coupled to the second node, wherein a control terminal of the second transistor is coupled to the output terminal of the operational amplifier, wherein the control terminal of the second transistor receives the first voltage signal.

8. The transmission device of claim 7, wherein the convertor generates the second voltage signal according to a resistance value of the second resistor and a current value of the sum of the second current and the third current.

9. The transmission device of claim 7, wherein the current mirror comprises:

a third transistor, wherein a first terminal of the third transistor is coupled to the reference high voltage;

a fourth transistor, wherein a first terminal of the fourth transistor is coupled to a second terminal of the third transistor and a control terminal of the third transistor, wherein a second terminal of the fourth transistor and a control terminal of the fourth transistor are coupled to the first node;

a fifth transistor, wherein a first terminal of the fifth transistor is coupled to the reference high voltage, wherein a control terminal of the fifth transistor is coupled to the control terminal of the third transistor; and a sixth transistor, wherein a first terminal of the sixth transistor is coupled to a second terminal of the fifth transistor, wherein a second terminal of the sixth transistor is coupled to the second node, wherein a control terminal of the sixth transistor is coupled to the control terminal of the fourth transistor.

10. The transmission device of claim 5, wherein the convertor comprises:

a current source, configured to provide the source current;

a first current mirror, coupled to a first node and the current source, configured to mirror the source current to generate a fourth current flowing through the first node;

a second resistor, coupled between a second node and the reference low voltage;

a second current mirror, coupled to the first node and the second node, configured to mirror the fourth current to generate the second current flowing through the second node; and a second transistor, wherein a first terminal of the second transistor is coupled to the reference high voltage, wherein a second terminal of the second transistor is coupled to the second node, wherein a control terminal of the second transistor is coupled to the output terminal of the operational amplifier, wherein the control terminal of the second transistor receives the first voltage signal.

* * * * *